(12) United States Patent
Poli et al.

(10) Patent No.: US 10,701,414 B2
(45) Date of Patent: Jun. 30, 2020

(54) LEGACY VIDEO NETWORK CONFIGURATION IN A DISTRIBUTED ACCESS ARCHITECTURE

(71) Applicant: ARRIS Enterprises LLC, Suwanee, GA (US)

(72) Inventors: Christopher Poli, Doylestown, PA (US); Steven J. Moscirella, Phoenixville, PA (US); Roger D. Gahman, Telford, PA (US); Robert Mack, Collegeville, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/386,214

(22) Filed: Apr. 16, 2019

(65) Prior Publication Data
US 2019/0327499 A1 Oct. 24, 2019

Related U.S. Application Data

(60) Provisional application No. 62/659,241, filed on Apr. 18, 2018.

(51) Int. Cl.
| | |
|---|---|
| *H04N 21/2381* | (2011.01) |
| *H04N 21/222* | (2011.01) |
| *H04N 21/231* | (2011.01) |
| *H04N 21/258* | (2011.01) |
| *H04N 21/235* | (2011.01) |
| *H04N 21/236* | (2011.01) |
| *H04N 21/2383* | (2011.01) |
| *H04N 21/2343* | (2011.01) |

(52) U.S. Cl.
CPC ..... *H04N 21/2381* (2013.01); *H04N 21/2221* (2013.01); *H04N 21/2343* (2013.01); *H04N 21/2353* (2013.01); *H04N 21/2383* (2013.01); *H04N 21/23109* (2013.01); *H04N 21/23614* (2013.01); *H04N 21/25841* (2013.01)

(58) Field of Classification Search
None
See application file for complete search history.

(56) References Cited

U.S. PATENT DOCUMENTS

2019/0036785 A1* 1/2019 Pfeffer .................. H04L 41/145

* cited by examiner

*Primary Examiner* — James R Marandi
(74) *Attorney, Agent, or Firm* — Chernoff, Vilhauer, McClung & Stenzel, LLP

(57) ABSTRACT

In one embodiment, a method receives a network topology of a distributed access architecture and a legacy video network. Video streams include characteristics that are associated with delivery via the legacy video network. The method selects a set of anchor points for a remote physical device in the distributed access architecture where the set of anchor points are associated with a geographic location of the remote physical device. A set of attribute labels are selected for the set of anchor points where the set of attribute labels associated with characteristics of the video streams. The method then generates a definition of video streams based on the anchor points and the attribute labels for a remote physical device configuration and generates the remote physical device configuration for video. The remote physical device configuration is used to provide the video streams to the remote physical device.

20 Claims, 8 Drawing Sheets

LEGACY VIDEO NETWORK CONFIGURATION IN A DISTRIBUTED ACCESS ARCHITECTURE

CROSS-REFERENCES TO RELATED APPLICATIONS

The present disclosure claims priority to U.S. Provisional App. No. 62/659,241 filed Apr. 18, 2018, the contents of which is incorporated herein by reference in its entirety.

BACKGROUND

The evolution of a video plane and a data plane have traditionally been disconnected. A traditional radio frequency (RF) combiner network at a headend has allowed video and data to have a fair degree of independence during delivery of both video and data. However, distributed access architectures (DAAs) remove the digital to analog conversion from the headend to a remote device. The distributed access architecture introduces difficulties in configuring a legacy video network for video delivery in the distributed access architecture. For example, configuring a remote physical device is challenging because it is not known what video services are connected to a specific remote physical device during deployment. Further, scaling the architecture across multiple remote physical devices is also problematic. For example, the remote physical device configuration needs to be generated manually for each remote physical device.

DETAILED DESCRIPTION

Described herein are techniques for a networking system. In the following description, for purposes of explanation, numerous examples and specific details are set forth in order to provide a thorough understanding of some embodiments. Some embodiments as defined by the claims may include some or all of the features in these examples alone or in combination with other features described below, and may further include modifications and equivalents of the features and concepts described herein.

Some embodiments allow the automatic configuration of devices in a distributed access architecture (DAA). A distributed access architecture may include remote physical devices (RPHY), remote media access control physical devices (R-MACPHY), remote optical line terminal (OLT) devices, and other devices that remove the digital to analog conversion from a headend to the remote device. A remote physical device, which converts the optical digital signal to radio frequency (RF) or a quadrature amplitude modulated (QAM) signal, will be used for discussion purposes, but other remote devices may be appreciated. Some embodiments define a video configuration for video delivery at various points in a video stream construction. A system uses anchor points with attribute labels and anchor point label rules to generate the configuration for video delivery using remote physical devices. The use of anchor points and labels allows a management system to drive both manual and automated configuration changes to headend distributed access video generation elements and legacy video components to the remote devices in the distributed access architecture. Anchor points can be aligned to points in the physical plant, such as a geographic location or a physical distribution path. Labels represent video characteristics that can be tied to anchor points. The attribute labels are used to tie legacy video components with certain attributes to anchor points to allow system configuration options to be reduced or automated decisions to be made by the system.

System Overview

Figure 1:
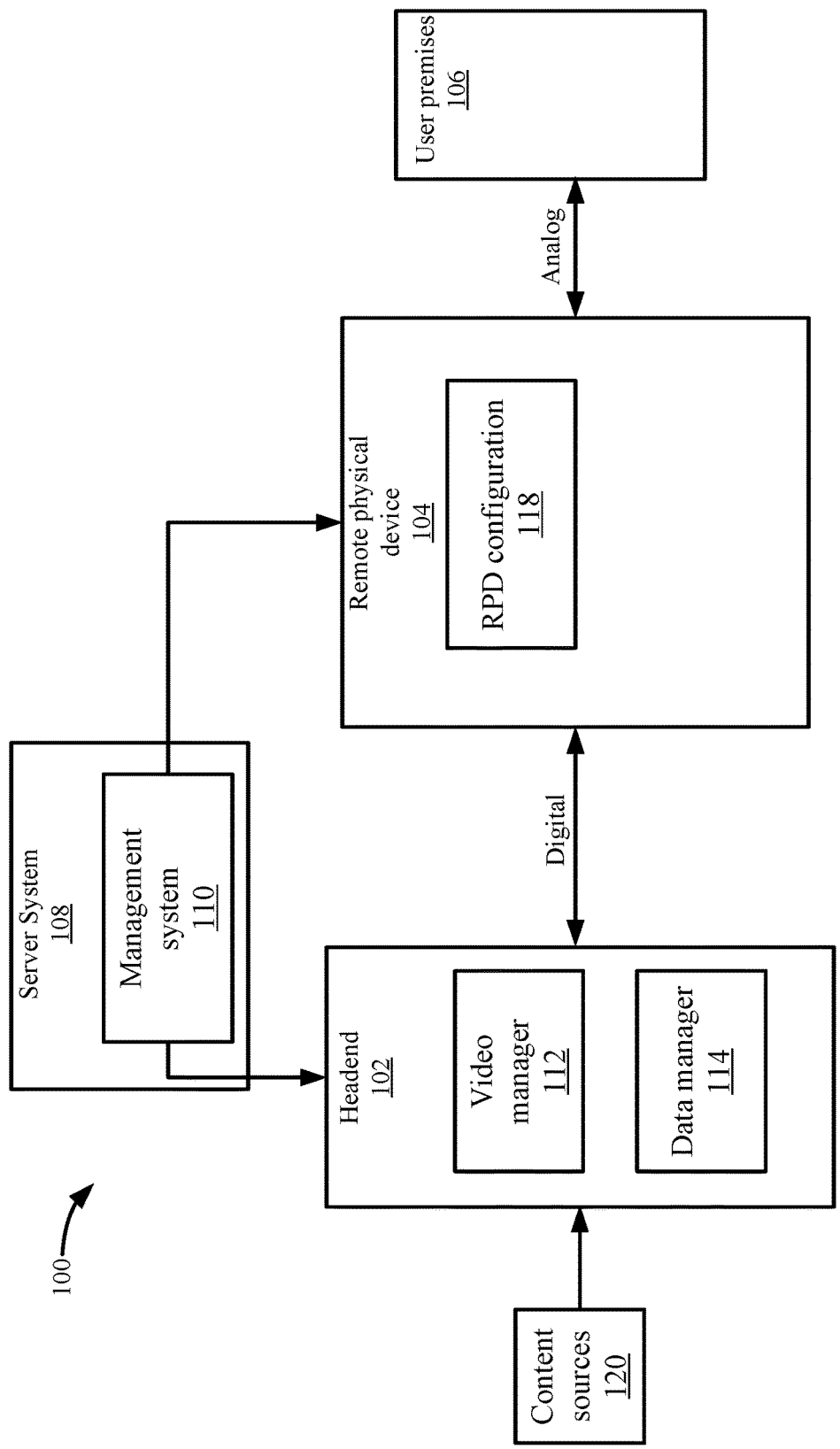
FIG. 1 depicts a simplified system of a method for delivering data and video according to some embodiments.

FIG. 1 depicts a simplified system 100 of a method for delivering data and video according to some embodiments. System 100 includes a headend 102, a remote physical device 104, user premises 106, and a server system 108. System 100 may be a distributed access architecture as discussed above where digital optical components are used to replace analog optical components between the headend and the remote physical device 104, which allows the physical components to perform the analog to digital (and RF) conversion be configured deeper in the network closer to user premises 106. Headend 102 may deliver video and data to user premises 106 using remote physical device 104. Although a single user premises 106 and single remote physical device 104 are shown, remote physical device 104 may be coupled to multiple user premises 106. Additionally, system 100 may include multiple remote physical devices 104 that are coupled to different sets of user premises 106.

Headend 102 may receive video and data from content sources 120. A video manager 112 may manage the video delivery to user premises 106 and a data manager 114 may manage the data delivery to user premises 106. In some embodiments, headend 102 may deliver both video and data to user premises 106 via the same RF frequency spectrum. For example, the RF frequency spectrum may include an upstream frequency range and a downstream frequency range. The downstream frequency range may deliver both video and data downstream from headend 102 to user premises 106 at different frequencies. Similarly, the upstream frequency range delivers video and data upstream from user premises 106 to headend 102.

Headend 102 may send the video and data signal via a digital network, such as via an optical signal. Remote physical device 104 may receive the digital signal and convert the signal to analog, such as to an RF signal. In the upstream direction, remote physical device 104 receives analog video or data from user premises 106, converts the analog video or data to a digital signal, and sends the digital signal to headend 102.

Video manager 112 may use an RPD configuration 118 to insert video and data into a digital signal that is sent to remote physical device 104. Remote physical device 104 then converts the video into analog at the corresponding frequencies and sends the analog signal to user premises 106.

RPD configuration 118 may be a list of addresses that pertain to video delivery. For example, the addresses may be multicast addresses for video streams. Video manager 112 uses the addresses that are associated with video streams received at headend 102 to determine which video to insert into the digital signal that is sent to remote physical device 104. For example, headend 102 receives various video streams based on a legacy video delivery through a legacy video network (e.g., a network that creates video streams and performs the QAM RF conversion at headend 102). Video manager 112 inserts the appropriate video into the digital signal with information about the desired frequency placement for the specific RPD configuration 118 and provides the video to specific remote physical device 104.

RPD configuration 118 may be generated using anchor points, labels, and label rules. The anchor points may be used to describe components of the video distribution of the video streams that are configured to use the legacy video network. For example, anchor points may align to a geographical location or components in a physical distribution path to remote physical device 104. In some embodiments, the anchor points establish a logical structure of a video distribution topology that is used to generate the RPD configuration 118 to allow the correct video services to be delivered to the correct frequencies of a video signal that is sent to user premises 106. The labels may represent video characteristics that can be tied to anchor points. The labels may correspond to some aspect of the video delivery, such as some video services associated with a legacy video network. The anchor points and labels are then used to generate configuration of RPD configuration 118 to provide video services.

Server system 108 includes a management system 110 that can define the anchor points, labels, and label rules. Management system 110 then uses the anchor points, labels, and label rules to generate RPD configuration 118.

Management System

Figure 2:
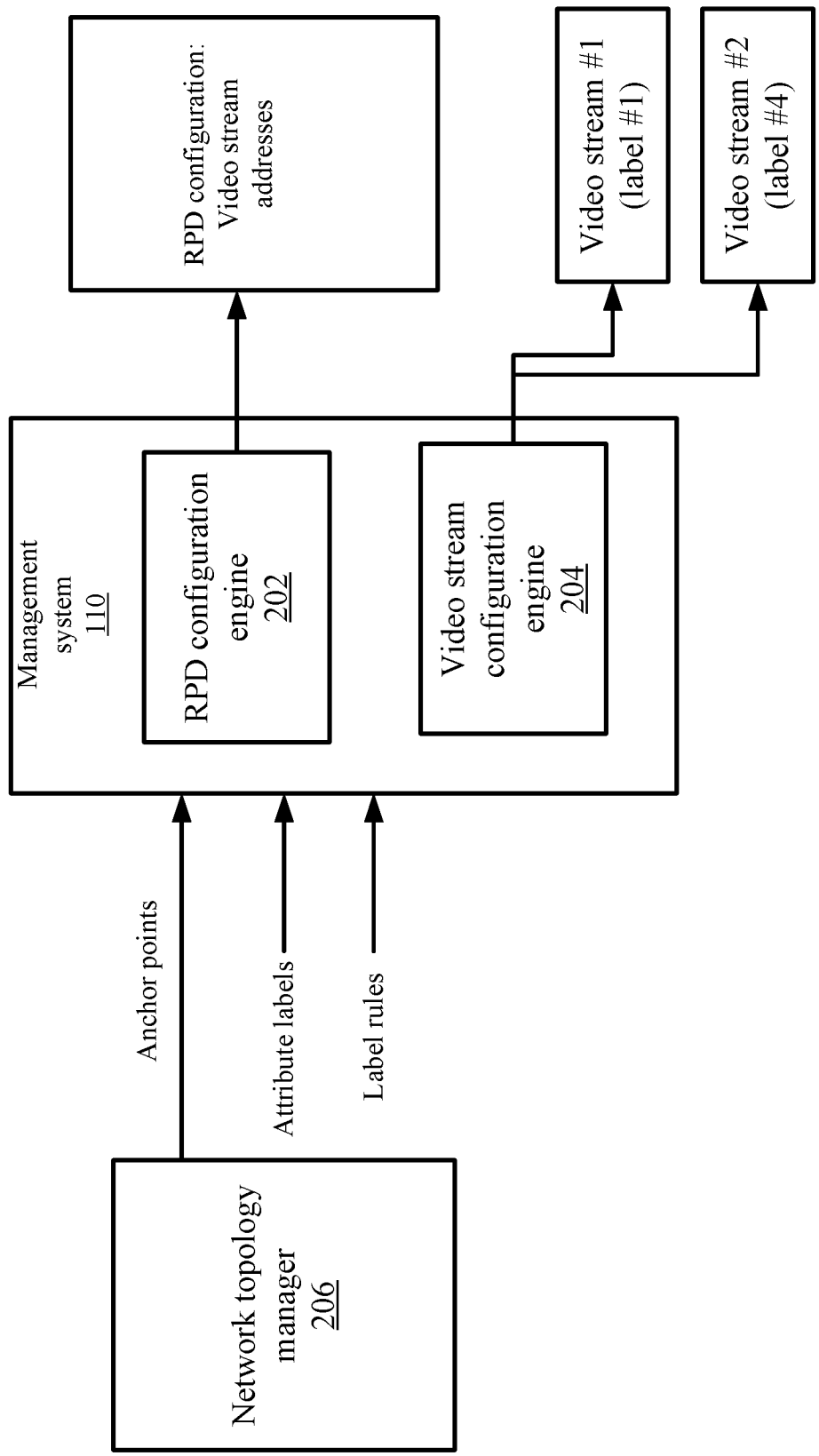
FIG. 2 depicts a more detailed example of a management system according to some embodiments.

FIG. 2 depicts a more detailed example of management system 110 according to some embodiments. Management system 110 includes an RPD configuration engine 202 that generates RPD definitions and a video stream configuration engine 204 that configures video streams. Both RPD configuration engine 202 and video stream configuration engine 204 use anchor points, attribute labels, and label rules that will be used to create specific RPD configurations based on the corresponding attribute(s) of the specific remote physical device placement in the physical network or connection to associated anchor points feeding the physical network.

A network topology manager 206 determines the network topology, which may include physical and logical components. Network topology manager 206 may determine the legacy components in the legacy video network and also distributed access architecture components. Some examples of components may include video service multiplexers, components on either side of remote physical device 104, remote physical device 104, etc. The anchor points establish a logical structure of a video distribution topology. For example, the downstream and upstream cable modem termination system (CMTS) blade identifier, Data Over Cable Service Interface Specification (DOCSIS) set-top-box gateway tunnel descriptors associated with the blade (DOCSIS Set-top-box gateway (DSG) Downstream Channel Descriptor (DCD) configuration), and other logical component identifiers may be set as anchor points. Labels represent video characteristics that can be tied to the anchor points. Examples of labels may include ad zones, channel maps, service identifiers, video streams, location group identifiers, video frequency channel definitions, upstream channel identifiers, geographic locations such as zip codes, etc. Label rules may be associated with anchor points and are used to automate, pre-populate, and change RPD configurations 118, such as to generate RPD configurations 118 for other remote physical devices 104.

To identify an anchor point for remote physical device 104, legacy information is used. For example, a Downstream Channel Descriptor configuration within the network provides a control channel for a DOCSIS set-top-box gateway (DSG set-top-boxes have DOCSIS modems that receive control channel information through a DOCSIS Set-top-box gateway tunnel embedded in the data path) that represents a unique set of information or at least a more limited set of information for out-of-band video information that can be used to both facilitate the harvest of related video information from the legacy video network elements and configure remote physical device 104. Management system 110 may use the information from the DSG tunnel to populate video attribute configuration information to determine the anchor points or attribute labels and ultimately the desired video service sets and frequencies for that section of plant or group of user premises to which that information applies.

The DSG tunnel source identifies a stream source, such as an Internet Protocol (IP) stream source from which video controller and where to retrieve channel map information related to the portion of the network where the distributed access architecture is being deployed (Channel Map/Electronic industries alliance (EIA) frequency definition, associated PEG services, etc.). There may be other DCD related information that is useful, such as emergency alert system (EAS) Broadcast tunnel, switched digital video (SDV) for out-of-band mini-carousel data tunnel, other data tunnels, etc. The DCD configuration is completed at the "DOCSIS" level (e.g., outside the set up of remote physical device 104) and is used as an example of an anchor point in the network. Identifying the control channel or EAS or SDV sources also limits otherwise uncorrelated labels (e.g., AdZone, PEG-Zone (if not explicitly tied to DSG Tunnel), video on demand (VOD) Service Group, Switched Service Group) that might be applied to the anchor point of a DSG tunnel configuration for remote physical device 104 that are geographically part of the legacy video network.

Additional video related information harvested in this way can be applied upstream as the video service construction becomes more virtualized and/or is managed through existing elements. Creating Multiple Program Transport Streams (MPTS) video muxes or providing packet identifier (PID) insertion on those muxes (EAS, SDV in-band mini-carousel, DTA Control Stream, EBIF streams, etc.) can be managed with a similar anchor points and attribute labels with associated anchor point label rules.

Extending the anchor points and labels to in-band systems is possible through similar anchor point and attribute label groupings. For example, in a DVB System, labels associated to specific NIT and session data transport (SDT) distributions in the legacy video network that would be used in place of SCTE-65 information to develop the Channel Map/channel frequency definitions/label(s).

In addition, labels can be further customized to specific regional deployment requirements (e.g., Public, Education, Government or PEGs video service distributions are sometimes much smaller than at an AdZone or Regional/Market Area or Off-Air channel level). These anchor points could specifically be geo-locators such as zip code, FIPS code, or related to municipal or political boundaries.

Labels or groups of labels could be used to uniquely identify and efficiently configure video distribution of video streams associated with legacy video networks to remote physical device 104 and used to efficiently configure any number of remote physical devices 104 that are associated to that set or subset of anchor points or labels.

Figure 3:
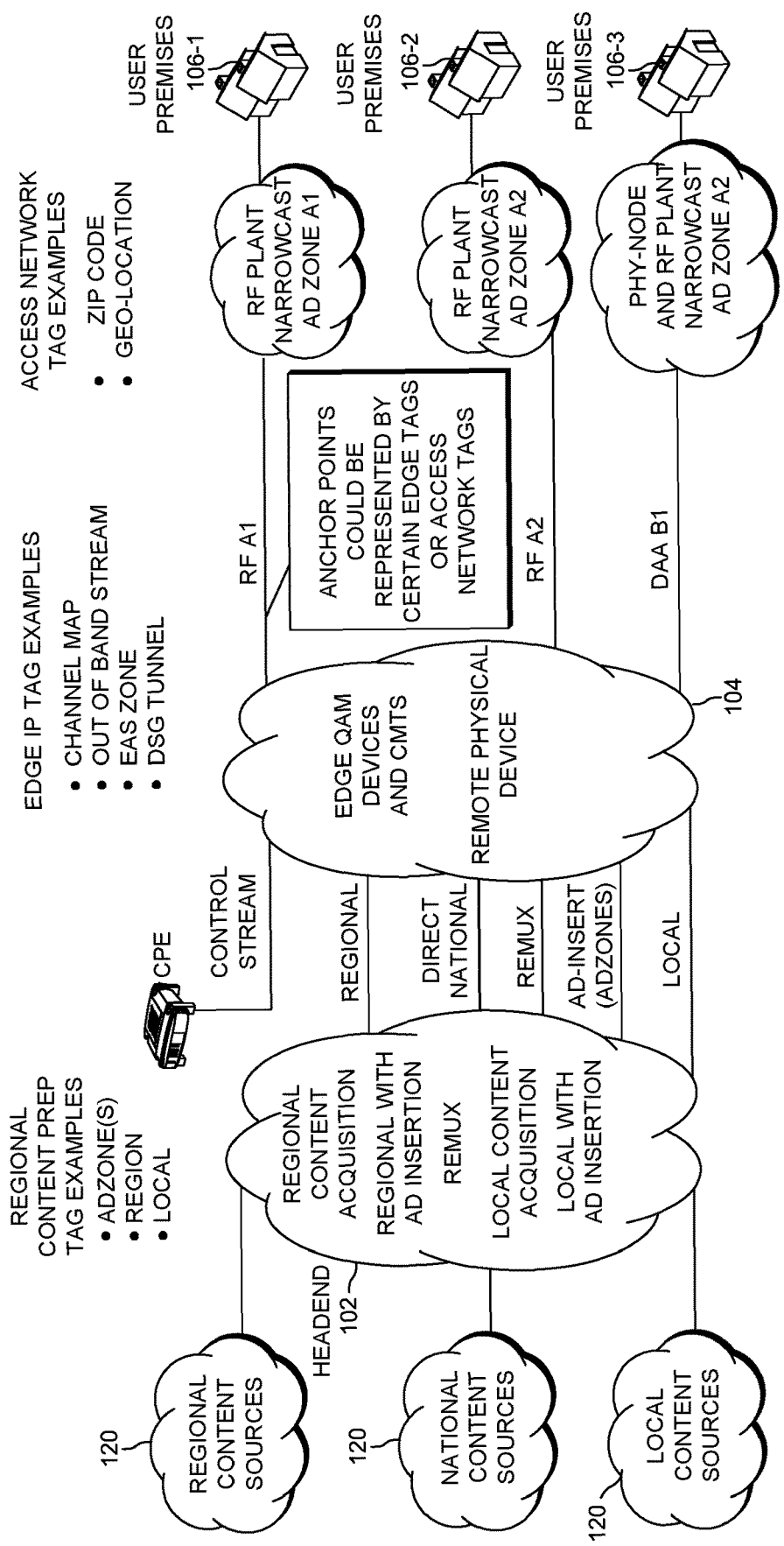
FIG. 3 depicts an example of tags for various components of the system according to some embodiments.

FIG. 3 depicts an example of tags for various components of system 100 according to some embodiments. The tags may be used as either anchor points or attributes. Headend 102 may receive content from regional content sources, national content sources, and local content sources 120. Headend 102 may provide various services, such as regional content acquisition, a regional video service with ad insertion, a remux service, local content acquisition, and local content service with ad insertion. The remux service may combine video and data together. Various tags may be provided, such as ad zone tags, region tags, and local tags. The ad zone may identify an ad zone area; a region tag may identify the different geographic locations; and a local tag may identify local areas.

Tags may be associated with a control stream, a regional video service, a direct national video service, a remux service, ad insertion ad zones, and a local video service. In the video delivery structure, remote physical device 104 may include tags such as a channel map, an out-of-band stream, an emergency alert system (EAS) zone, and a DSG tunnel. An access network between remote physical device 104 and user premises 106 may also include tags, such as a ZIP code for the user premises and geo-location for user premises 106.

For a first user premises 106, the access network tag examples may be an RF plant identifier and an ad zone identifier A1. For a user premises 106-2, the RF plant identifier may be RF A2 and an ad zone A2. For a user premises 106-3, the RF plant may be identified by a distributed access architecture DAA1 and an ad zone B.

Video stream configuration engine 204 applies labels to different video streams. For example, labels may be applied to video streams based on characteristics of the video stream.

Allowing the application of labels (e.g., Channel Map/EIA definition, Ad zone, PEG, VOD Service Group, Switched Linear Service Group, adaptive bitrate streaming (ABR) content, etc.) to specific distributed access architecture networks to facilitate/automate the specific video services distributions associated to a specific deployment (e.g., specific DEPI and UEPI video-related distributions are identified, associated and anchored to the DSG Tunnel distribution point and/or remote physical device 104 in a way that individual multicast address (MCA) content streams can be grouped for association to unique source-specific content to/from remote physical device 104 and additional remote physical device deployments can take advantage of these groupings for their own configuration(s)).

Referring back to FIG. 2, RPD configuration engine 202 generates an RPD definition 118 based on anchor points, labels, and label rules. The set of labels and anchor points are used to select addresses for incoming video streams, such as multicast addresses for incoming video streams that are inserted into an RPD configuration 118 for a user premises 106. RPD configuration engine 202 uses the labels and anchor points to select the correct set of video stream addresses to be used for a particular remote physical device 104. For example, the set of user premises 106 that is coupled to remote physical device 104 are used to determine addresses for RPD configuration 118. The appropriate anchor point for the downstream or upstream CMTS blade identifier or associated DSG tunnel descriptors associated with the blade are used to select the correct video stream addresses for the RPD configuration 118. The video streams may be grouped together based on the anchor points and labels. The groupings may comply with video delivery in the distributed access architecture and group video streams based on their legacy video network characteristics.

For example, in one possible implementation, using the defined DOCSIS Downstream Channel Descriptor (DCD) configuration of a data element (e.g., the DSG Tunnel definition in the CMTS at time of the "node split" or installation of remote physical device 104), RPD configuration engine 202 identifies the associated multicast address (MCA) source definitions. From the source multicast addresses of video streams, RPD configuration engine 202 may:

identify the Conditional Access Tunnel(s) for remote physical device 104, and use that information to identify the specific channel map distribution(s) to harvest Virtual Channel Map EIA channel definitions and Video Mux definitions; from the Channel Map, identify the specific services associated with this distribution including adding appropriate Labels for the AdZone, OutOfBandControlChannel, PEGs or other applicable information to group distributions; from the services, also identify Mux related PID Insertion requirements (e.g., digital television adapter (DTA), SDV, DVB) that might be used in creating the video streams that will be Downstream External PHY Interface (DEPT) wrapped for RPD distribution;

identify the Broadcast Tunnel such as the EAS Generator source that is appropriate for the zone where remote physical device 104 will be configured; this information can be used to populate EAS PID Insertion into associated video streams (before DEPI wrapping) for that RPD distribution; and optionally identify the Switched Digital Video Data Tunnel being used to identify Narrowcast EIA, Narrowcast Service Group, remote procedure call (RPC) and Control Channel (R6) information and video switching prior to DEPI wrapping.

The resultant set of configuration information can be used by RPD configuration engine 202 to configure a specific RPD configuration 118 for the video portion of the configuration. Accordingly, RPD configuration engine 202 defines the critical elements and relationships for to be applied on any given RPD deployment either at remote physical device 104 or on the Internet Protocol (IP) side of the video network feeding remote physical device 104 and to use remote physical device 104 as an anchor point of these definitions. Labels with functional/purposeful attributes and defined relationship rules provide information that will be used to select video sources (including source mux'es that have been combined and/or altered for other remote physical devices 104) and to manipulate those video sources along with video control plane streams to realize the definition at the anchor point.

In some implementations, the starting anchor point for RPD configuration 118 should be identified in the data side of network, such as a DSG Tunnel configuration; however, if such a construct is not available (such as in-band/DVB), then the anchor point may be related to the system information (SI) distribution such as combination of a network information table (NIT)/SDT elements that are targeted for that remote physical device. Management system 110 establishes or harvests as much information as is available from the existing legacy video network to define the video edge requirements based upon where in the legacy video network remote physical device 104 will be deployed.

In addition, attribute labels may be used with appropriate rule sets that allow for the configuration or re-configuration of a system based on those rules. Management system 110 uses labels and label rules to automate/prepopulate/change the remote physical device configuration as well as the video core feeding remote physical device 104. When a new remote physical device 104 is deployed into an existing geographical location, configuration of an existing remote physical device that may be anchored to an existing label can be used to populate the new configuration using label rules. The configuration may auto-populate based on the label rules applying the same geo-location information. One example of a label rule may be if multiplexers from different ad zones are configured for delivery to remote physical device 104, an alarm may be generated.

Figure 4:
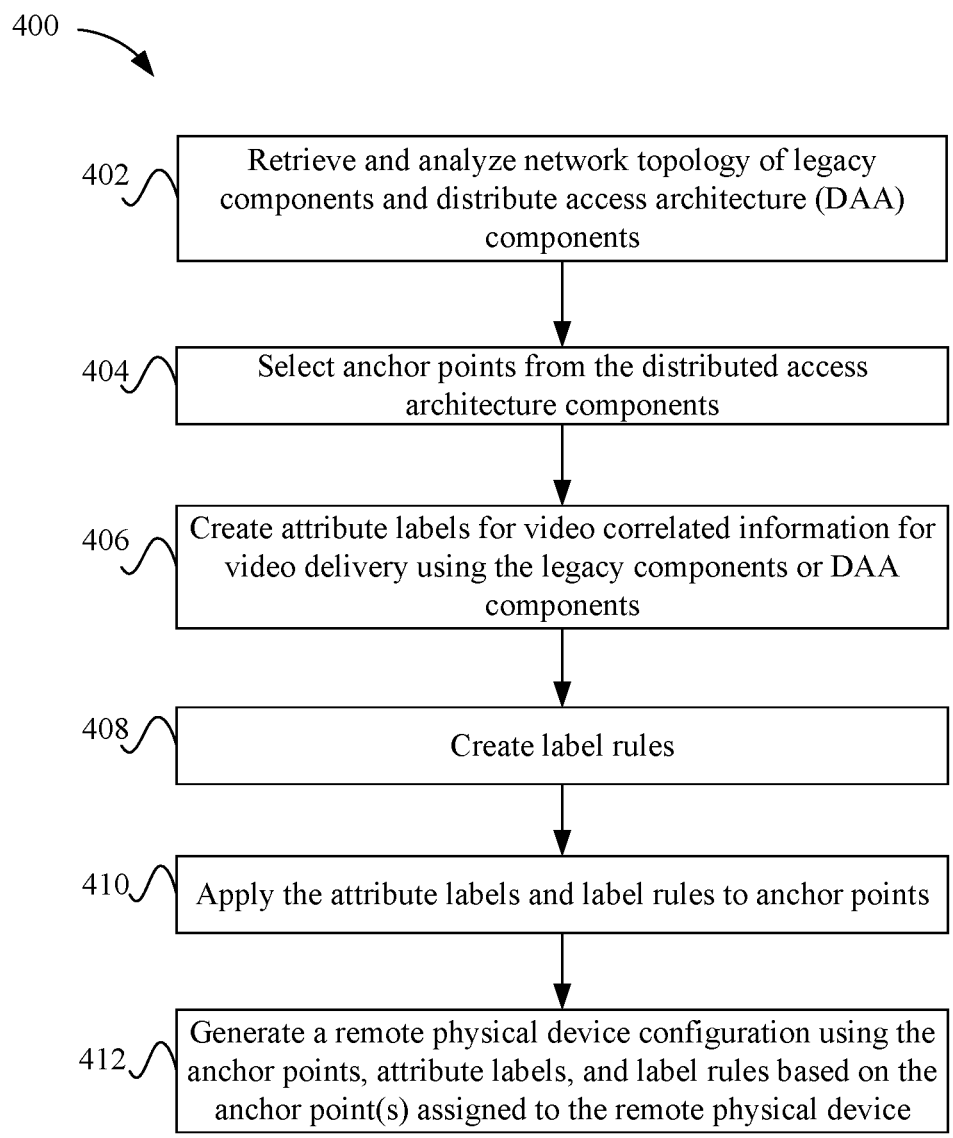
FIG. 4 depicts a simplified flowchart of a method for generating remote physical device configurations according to some embodiments.

FIG. 4 depicts a simplified flowchart 400 of a method for generating remote physical device configurations according to some embodiments. At 402, management system 110 retrieves and analyzes a network topology of legacy components in for a legacy video network and distributed access architecture components.

At 404, management system 110 selects anchor points from the distributed access architecture components. For example, the distributed access architecture is used to deliver the video that was delivered previously by legacy components. The information from the legacy components may be used to select appropriate anchor points from the distributed access architecture components that will be used to deliver legacy video services. As discussed above, anchor points may include geographic locations or physical distribution paths in the distributed access architecture.

At 406, management system 110 creates attribute labels for video-correlated information for video delivery using the legacy video network components or distributed access architecture components. The attribute labels may be logical tags that represent unique video-correlated information. Example labels include:

Distributions such as video source multicast addresses or video destination multicast addresses;
Video streams such as service Single Program Transport Stream (SPTS), service Multiple Program Transport Stream (MPTS), control channel, SDV Mini-carousel, etc.;
Video configuration items such as channel maps, PID Insertion, Service IDs; and
Functional defined elements.

Example labels associated with specific configurations or stream definitions might include: RPD Configuration:
LocationGroupID (could be combination of DSGTunnelID, ZipCode, FIPSCode or other identifiers that would allow remote physical device 104 to be configured with the same/similar configuration or be the basis for a split);
AdZoneGroupID;
EIA Video Frequency Channel Definition (represents the channels associated to video services); and
DEPI Configuration
  1. Video MCA Address(es)
  2. Video Service mux(es)
    (1) ONE of each Type (National/OffAir, AdZone, Narrowcast, PEG, ControlChannel)
  3. UEPI Configuration
    (1) Aggregation Destination (Upstream Channel Identifier). Video Service Mux(es)
Video Service Mux ID (National/Regional Group, AdZoneGroupID, NarrowcastGroup, PEGGroup, ControlChannel—each Mux may only be allowed one of these labels);
Services Mux List (1 or more—below defined for each Service)
  1. Source MCA or uniform resource locator (URL),
  2. Type (MP2/UDP, HLS, DASH-CIF, DASH-other),
  3. Rate (CBR, ABR),
  4. Access Criteria/Encryption/CCI
    (1) Encryption may drive additional attribute requirements such as DTA PID Insertion,
  5. PID Insertion (EAS, DTA, SDV, etc. Multiple Insertions allowed, Zero is OK)
    (1) May be inherited by any given Label within the Label Group such as DTA PID Insertion set on basis of Encryption,
Switched Narrowcast service groups
  1. ServiceGroupNumber, ServiceGroupName,
  2. TSID/QAM,
  3. SwitchedSourceList (based on specific SDV system in place).

Addresses to anchor points that may then be used as a unique configuration grouping of elements. For example, configuration groupings may apply either to a group of remote physical devices 104 or to a group of video services, or any combination.

At 408, management system 110 creates label rules. The label rules may be used to allow scaling and re-application of specific configurations. Example rule sets that might be used or applied to RPD configuration 118 might include:
Only one ControlChannel of each ControllerType (where ControllerType(s) represents the underlying control stream(s) defined in SCTE-55);
Only one AdZone (or one from each hierarchical AdZone Level); and
Up to four DEPI MCA Sources and up to 16 DEPI MCA.

At 410, management system 110 applies the attribute labels and label rules to anchor points. For example, various attribute labels may be applied to anchor points.

At 412, management system 110 generates an RPD configuration 118 using the anchor points, attribute labels, and label rules based on the anchor points assigned to a remote physical device 104. The anchor point for remote physical device 104 may be used to associate attribute labels that can be used with respect to the anchor point. For example, a remote physical device 104 in a certain geographic location may receive a specific ad zone label. Information that allows the delivery of the video streams to remote physical device 104 may be added to RPD configuration 118.

In some examples, a remote physical device 104 is placed into service and associated to a CMTS upstream blade U1 and downstream blade D1. Downstream Blade D1 has a set of DSG Tunnels configured with a DCD message. The Downstream Blade D1 becomes associated to an Anchor Point APD1. The DCD message can be examined to find the source controller as well as the set of channel maps distributed on that section of network plant. The channel maps can be examined to determine the set of PEG channels distributed on that section of plant as well as certain services that cannot be explicitly determined such as a service associated to an ad zone. When configuring remote physical device 104, only applicable options would appear. If the resolution is 100% deterministic, then the system can automatically configure the video services from the headend distribution and the RPD configuration. If there is one set of off-air services (defined within a security domain and by the controller sourcing the channel map) or if there is one set of PEG Services for that specific anchor point distribution path, management system 110 may configure both the headend elements to make those signals available and configure the specific remote physical device 104 to select those signals with the associated frequency placement definitions. If the resolution is not 100% deterministic, then management system 110 can present a more limited set of options, such as to a user, to choose the correct service(s) to configure to remote physical device 104. For example, there may be several versions of each Ad-Zone service within the controller or several sets of PEG channels defined within the channel maps on that downstream blade D1 downstream. Management system 110 may present an option to select either the specific service (Service X, Ad Zone E) or a label (Ad Zone A through G). Once either is selected, the balance of service selections may become 100% deterministic based on the label rules. Further, anchor points may be associated to larger groups—for example, the anchor point APD1 may be associated to zip code 12345. If another remote physical device is turned up and associated to zip code 12345, then that remote physical device can inherit the label attributes of the first remote physical device. In the absence of a DSG plant, a substitute anchor point might be a specific Out of Band Channel distribution or a DVB NIT distribution.

Video delivery

Figure 5:
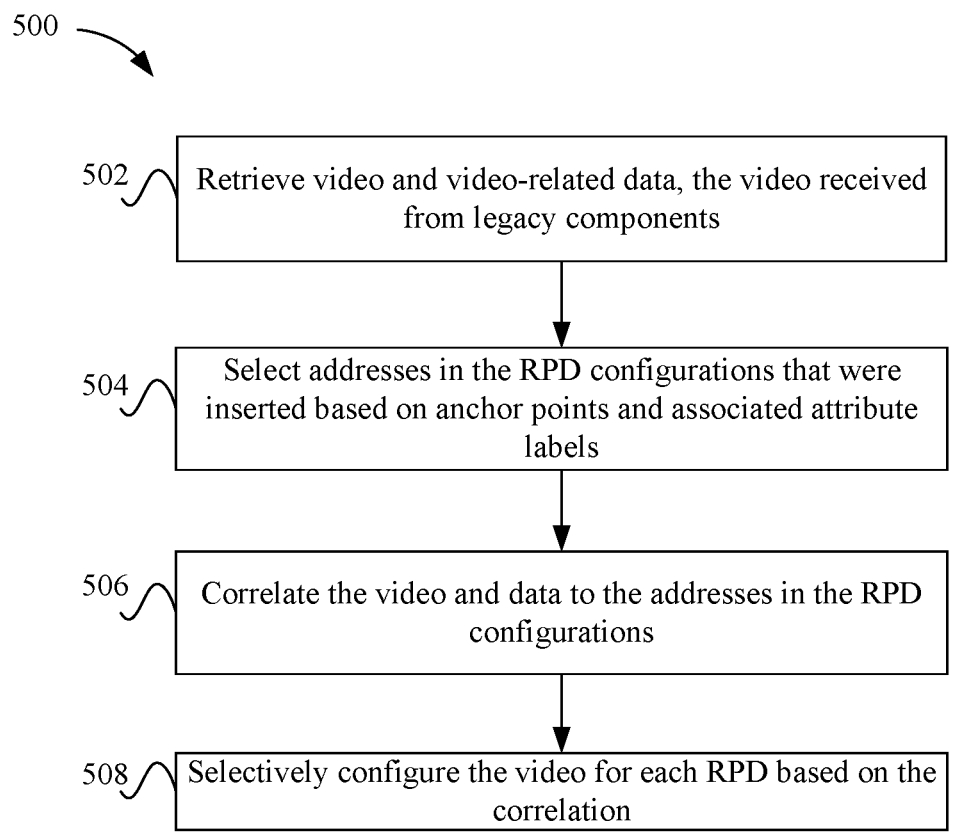
FIG. 5 depicts a simplified flowchart of delivering video to a remote physical device according to some embodiments.

Once assigning anchor points and labels, and generating RPD configuration 118 with the anchor points and labels, headend 102 can provide video to remote physical devices 104. The anchor points establish a specific tie to a video topology. The labels are associated either directly or indirectly to those anchor points based on legacy information associated with the legacy video network components. FIG. 5 depicts a simplified flowchart 500 of delivering video to remote physical device 104 according to some embodiments. At 502, headend 102 receives video and video-related data. The video may be received from video streams having characteristics based on legacy video network delivery. For example, video streams may be received based on a legacy distribution scheme. That is, the video may be received for distribution via a legacy video network. At 504, headend 102 selects addresses in RPD configurations 118 that were inserted based on anchor points and associated attribute labels. The addresses may be associated with video streams that have been received at 502. Then, at 506, headend 102 correlates the video streams to the addresses in RPD configurations 118. This causes certain video streams to be pulled by different remote physical devices 104. For example, at 508, headend 102 selectively configures the video streams to each remote physical device 104 based on the correlation.

Figure 6:
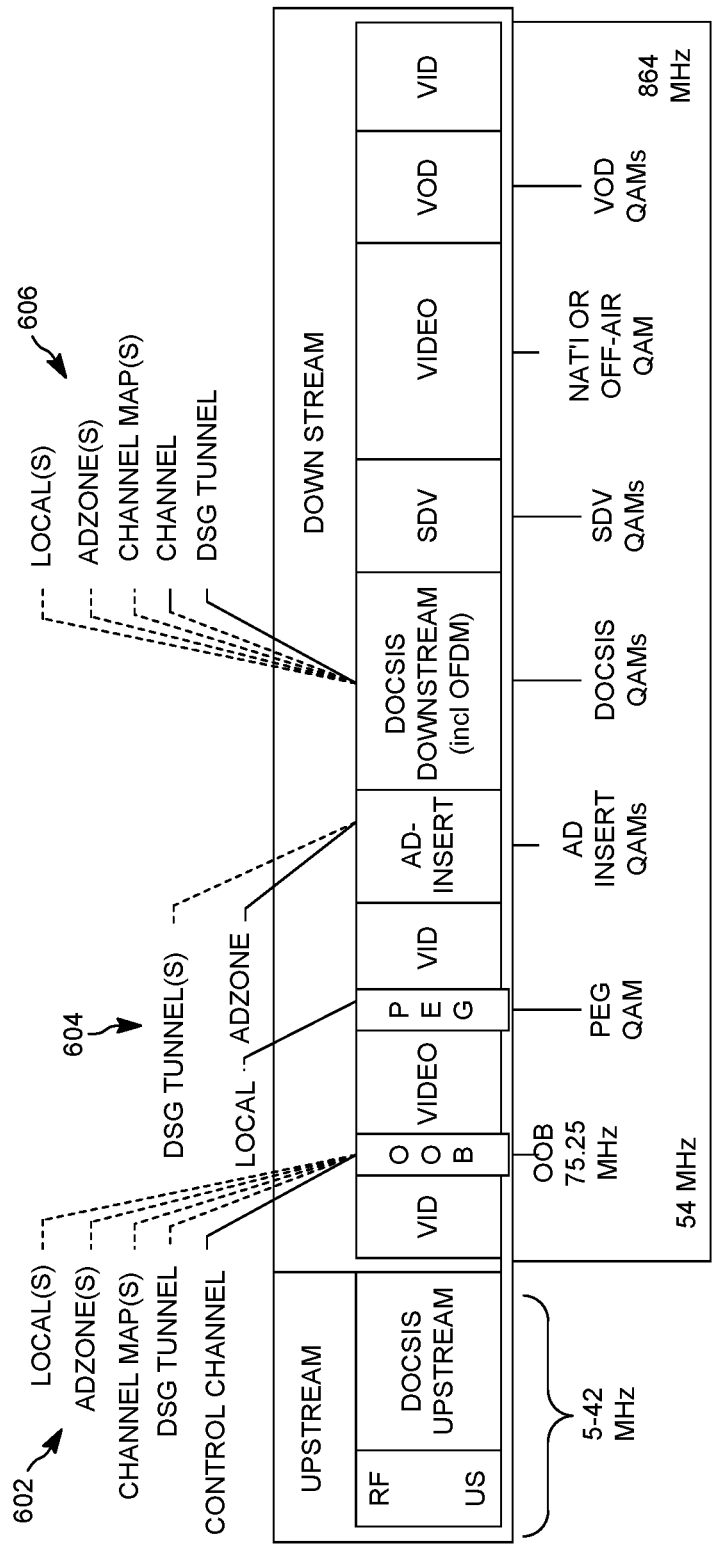
FIG. 6 shows an example of a distribution of video stream constructs that define a desired set of video services on a frequency spectrum according to some embodiments.

FIG. 6 shows an example of a distribution of video stream constructs that define a desired set of video services on a frequency spectrum according to some embodiments. The labels may be used to define where headend 102 inserts video from video streams on specific frequency ranges. Each video stream may be defined by an identifier, such as a tuning triplet of channel frequency, modulation mode, and service number. Each subset of the video streams may be tied to an anchor point. Video streams can be added or deleted to the distributions. A distribution can also move from one channel frequency to another. Using the set of anchor points and labels to drive the configuration maintains a consistent set of information across disparate systems.

The downstream frequency range may be separated into various ranges that are associated with different distributions, such as video, out-of-band control signaling, public access network, government access channels (PEG), ad insertion, DOCSIS downstream, switched digital video (SDV), national or off-air video, video-on-demand (VOD), etc. Each of the different videos may be associated with different physical devices, such as different quadrature amplitude multiplexers (QAMs). The anchor points and labels are used to identify the multiplexers.

In FIG. 6, an upstream channel may be from 5-42 MHz and a downstream channel may be from 54 Hz to 864 MHz. Although these frequency ranges are described, other frequency ranges for the upstream or downstream channels may be appreciated. Various anchor points may be defined as control channel, local, ad zone, and DSG tunnel. The values of the anchor points define a geo-location of remote physical device 104. The attributes at 602 are associated with an out-of-band (OOB) frequency range that sends out of band signals. Also, the attribute at 604 is associated with an ad insertion frequency range and the attributes at 606 are associated with a DOCSIS downstream frequency range. Attribute labels may be associated with the anchor points, such as at 602, the attributes local, ad zones, channel maps and DSG tunnel are associated with control channel. At 604, the DSG tunnel is associated with the Ad zone anchor point, and at 606, local, ad zone, channel map, and channel associated with the anchor point of DSG tunnel.

Figure 7:
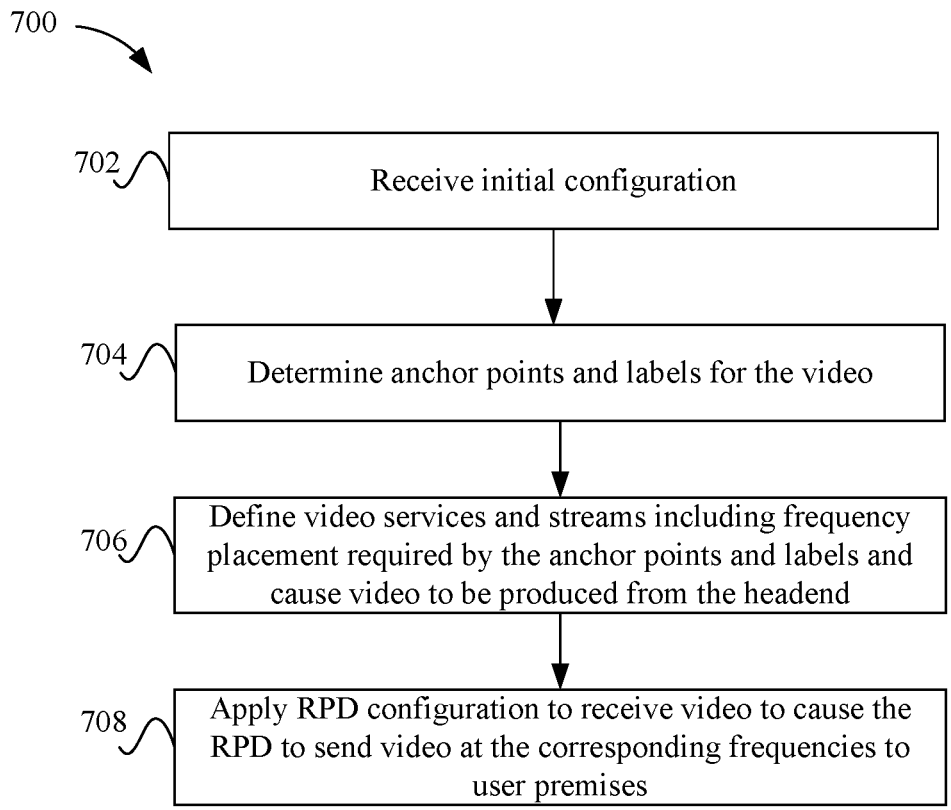
FIG. 7 depicts a simplified flowchart of a method for processing video according to some embodiments.

FIG. 7 depicts a simplified flowchart 700 of a method for processing video according to some embodiments. At 702, remote physical device 104 receives an initial RPD configuration 118. RPD configuration 118 may be generated using label rules that may use a configuration from another remote physical device 104, such as a remote physical device in the same geo-location. The label rules may determine how anchor points and labels can be associated with remote physical device 104.

At the time of an installation of remote physical device 104 (for example, starting from I-CCAP structure), whether the installation is (1) RPD shelf in headend 102 or a hub or (2) remote physical device installation in a remote node, a Downstream Channel Descriptor (compliant with DOCSIS specifications) may need to be defined for what is effectively a "data node" split to support the legacy DSG set-top-boxes on that portion of the network. The Downstream Channel Descriptor may be associated with a remote physical device's downstream data service.

Management system 110 ingests the DCD associated with the specific remote physical device 104 and uses the Multicast Address (MCA) tunnel information to associate (1) channel map(s) distributed on that specific DSG plant, (2) EAS Generator, and (3) SDV System (if applicable). Management system 110 uses the MCA's to identify the associated upstream equipment (e.g., video controller, EAS, Switched Digital Video System). Management system 110 queries the upstream equipment for channel map, EAS PID Insertion, service group related information which would auto-populate an RPD configuration 118.

Management system 110 would have the option to select a specific channel map if more than one exists. Also, management system 110 would have the option to connect EAS PID Insertion if the video services are directly managed. Management system 110 would have the option to connect R6 PID Insertion to create a specific DSG Tunnel flow through remote physical device 104. Management system 110 would have the option to connect RPC PID Insertion to the associated SDV Service QAMs. Management system 110 would have the option to modify these flows with unique labels related to the region (ad-zone, PEG, VOD or SDV Service Group, Control Channel) to the specific remote physical device 104. Finally, management system 110 would have the option to confirm labels related to the entire region (National/Off-Air) to the specific remote physical device 104.

Management system 110 configures video distributions and insertion of associated information (PID Insertion) related to National/Off-Air, Ad-Insertion, PEG, Narrowcast, and Control Channel video flows to remote physical device 104. The specific label values would be identified as a label group (for future RPD deployments). Alternatively, management system 110 would allow the selection of channel map and label group pairs.

At 704, remote physical device 104 determines anchor points and labels for the video. For example, once applied, RPD configuration 118 includes a set of addresses pertaining to desired video that is to be received by remote physical device 104. The multicast video distribution may fall within three categories of broadcast, which includes an ad zone and government access channels, narrowcast which includes switched digital video and video-on-demand, and a control channel that includes out-of-band provisioning and digital video control channel. The anchor points along a geographical location or physical distribution paths may be correlated to the desired video, such as control channels that carry channel maps. In a digital video broadcast system, anchor points may be a downstream blade as it represents a physical distribution or a geographic location. Labels represent video characteristics that can be tied to the anchor point, such as ad zones and government access channels can be tied to the underlying geographic locations of anchor points. Channel maps may be tied to the path distributions. The anchor points and labels are then used to include addresses in the RPD configuration 118.

At 706, the sets of video services and streams are aligned according to anchor points and labels for the video that needs to be produced by headend 102 for remote physical device 104. At 708, apply the RPD configuration to receive the video. Remote physical device 104 then receives video according to the addresses in its RPD configuration 118. Remote physical device 104 converts the video to analog, such as radio frequency (RPD or MACPHY) or to an analog optical signal (R-OLT), and correlates the video to the RF spectrum based on the information defined in 706 that is conveyed within the video streams according to the remote physical device standards. For example, remote physical device 104 may insert the video at various frequencies that are defined by the standard DEPI wrapping within the received video streams. In some examples, video may be inserted in a frequency range as specified in FIG. 6. Remote physical device 104 sends the video at the corresponding frequencies to user premises 106.

Moving the OOB channel on a group of nodes (for example, from 75.25 MHz to 104.2 MHz) might be needed as part of a DOCSIS 3.1 deployment/creating more upstream channel bandwidth. Management system 110 could be used to select the group of remote physical devices that are targeted for the move and use the channel map and SCTE-55 associated labels and the EIA template to effect a new frequency distribution by simply replacing the existing labels with the new labels that will result in altering the configuration of remote physical device 104 to be consistent with the new labels.

In any DSG configured/out of band control channel system, the same or similar approach may apply. DSG Tunnels represent a unique video distribution that is explicitly tied to the data plane for out of band data. For in-band distributions such as DVB, the NIT and SDT distributions provide similar video information and these distributions would be anchor points for RPD configurations 118 in these systems. For passive optical network (PON) data/video systems that utilize a channel map or similar construct to identify linear content availability, the anchor points can be defined in terms of the video hub or control channel distribution serving that area. The information related to these or similar distributions can be used to capture video related information to be applied to RPD configuration 118 via associated labels.

System

Figure 8:
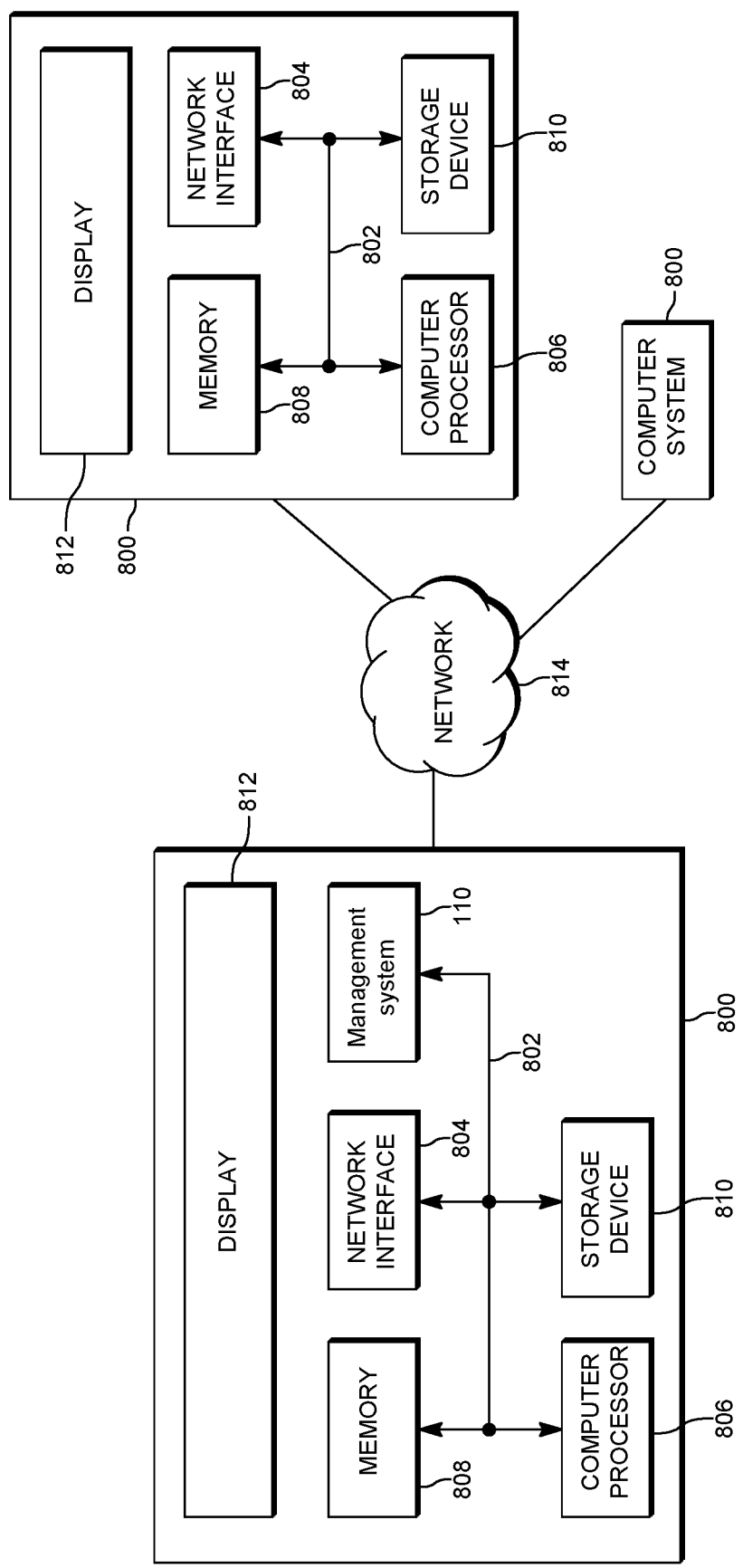
FIG. 8 illustrates an example of special purpose computer systems configured with a management system according to some embodiments.

FIG. 8 illustrates an example of special purpose computer systems 800 configured with a management system 110 according to some embodiments. Computer system 800 includes a bus 802, network interface 804, a computer processor 806, a memory 808, a storage device 810, and a display 812.

Bus 802 may be a communication mechanism for communicating information. Computer processor 806 may execute computer programs stored in memory 808 or storage device 810. Any suitable programming language can be used to implement the routines of some embodiments including C, C++, Java, assembly language, etc. Different programming techniques can be employed such as procedural or object oriented. The routines can execute on a single computer system 800 or multiple computer systems 800. Further, multiple computer processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The non-transitory computer-readable storage medium contains instructions for controlling a computer system 800 to be configured to perform functions described by some embodiments. The instructions, when executed by one or more computer processors 806, may be configured to perform that which is described in some embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of some embodiments may be distributed across computer systems 800 through network 814.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   selecting, by the computing device, a set of anchor points for a remote physical device in a distributed access architecture, wherein the set of anchor points are determined based on a location of the remote physical device in the distributed access architecture;
   selecting, by the computing device, a set of attribute labels for the set of anchor points, the set of attribute labels associated with characteristics of video streams, wherein the video streams include characteristics that are associated with delivery via a legacy video network;
   generating, by the computing device, a definition of a set of video streams based on the set of anchor points and the set of attribute labels for a remote physical device configuration; and
   generating, by the computing device, the remote physical device configuration for video, wherein the remote physical device configuration is used to provide the set of video streams to the remote physical device.

2. The method of claim 1, wherein generating the definition of the set of video streams and generating the remote physical device configuration comprises:
   determining a plurality of addresses for the set of video streams; and
   adding the plurality of addresses to the remote physical device configuration.

3. The method of claim 2, where the set of video streams is determined based on which user premises are coupled to receive from the remote physical device.

4. The method of claim 2, wherein the plurality of addresses are multicast addresses for providing the set of video streams to the remote physical device.

5. The method of claim 1, wherein generating the definition of the set of video streams based on the set of anchor points and the set of attribute labels for the remote physical device configuration is used to configure a headend output to produce the set of video streams to provide the set video streams to the remote physical device.

6. The method of claim 1, further comprising:
   determining distributed access architecture groupings that are associated with delivery of video to the remote physical device; and
   associating one or more attribute labels with the distributed access architecture groupings.

7. The method of claim 6, further comprising:
   associating one or more video streams with the one or more attribute labels with corresponding distributed access architecture groupings.

8. The method of claim 6, wherein the distributed access architecture groupings are associated with different frequency ranges for delivering video in the distributed access architecture.

9. The method of claim 1, wherein the set of anchor points are determined based on a downstream channel descriptor configuration associated with a downstream data service for the remote physical device.

10. The method of claim 1, wherein the set of anchor points are determined based on information for a tunnel to a device at a user premises.

11. The method of claim 10, wherein the information for the tunnel is used to identify the characteristics of the legacy video network.

12. The method of claim 1, further comprising:
    using label rules to generate the remote physical device configuration by adapting another anchor point and another attribute label from another remote physical device configuration.

13. The method of claim 1, further comprising:
    delivering the set of the video streams to the remote physical device using the remote physical device configuration.

14. The method of claim 1, further comprising:
    using the set of anchor points and the set of attribute labels to correlate the set of the video streams to a frequency ranges in a signal that is sent to a user premises.

15. The method of claim 14, wherein different video streams are configured at different frequency ranges based on labels associated with respective video streams.

16. The method of claim 1, wherein generating the definition of the set of video streams and generating the remote physical device configuration comprises:
    determining an address for an out of band stream; and
    adding the address to the remote physical device configuration.

17. A non-transitory computer-readable storage medium containing instructions that, when executed, control a computer system to be operable for:
    selecting a set of anchor points for a remote physical device in a distributed access architecture, wherein the set of anchor points are determined based on a location of the remote physical device in the distributed access architecture;

selecting a set of attribute labels for the set of anchor points, the set of attribute labels associated with characteristics of video streams, wherein the video streams include characteristics that are associated with delivery via a legacy video network;

generating a definition of a set of video streams based on the set of anchor points and the set of attribute labels for a remote physical device configuration; and generating the remote physical device configuration for video, wherein the remote physical device configuration is used to provide the set of video streams to the remote physical device.

18. The non-transitory computer-readable storage medium of claim 17, wherein generating the remote physical device configuration and generating the remote physical device configuration comprises:

determining a plurality of addresses for the set of video streams; and adding the plurality of addresses to the remote physical device configuration.

19. The non-transitory computer-readable storage medium of claim 18, further operable for:

determining distributed access architecture groupings that are associated with delivery video to the remote physical device; and associating one or more attribute labels with the distributed access architecture groupings.

20. An apparatus comprising:

one or more computer processors; and a non-transitory computer-readable storage medium comprising instructions, that when executed, control the one or more computer processors to be operable for:

selecting a set of anchor points for a remote physical device in a distributed access architecture, wherein the set of anchor points are determined based on a location of the remote physical device in the distributed access architecture;

selecting a set of attribute labels for the set of anchor points, the set of attribute labels associated with characteristics of video streams, wherein the video streams include characteristics that are associated with delivery via a legacy video network;

generating a definition of a set of video streams based on the set of anchor points and the set of attribute labels for a remote physical device configuration; and generating the remote physical device configuration for video, wherein the remote physical device configuration is used to provide the set of video streams to the remote physical device.

\* \* \* \* \*

UNITED STATES PATENT AND TRADEMARK OFFICE
CERTIFICATE OF CORRECTION

PATENT NO. : 10,701,414 B2
APPLICATION NO. : 16/386214
DATED : June 30, 2020
INVENTOR(S) : Christopher Poli et al.

Page 1 of 1

It is certified that error appears in the above-identified patent and that said Letters Patent is hereby corrected as shown below:

In the Specification

Column 6, Line 32: Replace "DEPT" with --DEPI--

Column 10, Line 12: Replace "54 Hz" with --54 MHz--

Signed and Sealed this
Fifth Day of March, 2024

Katherine Kelly Vidal
*Director of the United States Patent and Trademark Office*